United States Patent
Madsen

(10) Patent No.: US 6,748,142 B2
(45) Date of Patent: Jun. 8, 2004

(54) INTEGRATED OPTICAL DUAL DISPERSION COMPENSATOR FOR COMPENSATING BOTH CHROMATIC AND POLARIZATION MODE DISPERSION

(75) Inventor: Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 153 days.

(21) Appl. No.: 10/131,438

(22) Filed: Apr. 24, 2002

(65) Prior Publication Data
US 2003/0202749 A1 Oct. 30, 2003

(51) Int. Cl.[7] .................................................. G02B 6/30
(52) U.S. Cl. ......................................... 385/49; 385/32
(58) Field of Search .................... 385/32, 49, 129–132; 359/161

(56) References Cited
U.S. PATENT DOCUMENTS

| | | | | |
|---|---|---|---|---|
| 5,600,738 A | * | 2/1997 | Bergland et al. | 385/11 |
| 5,859,939 A | * | 1/1999 | Fee et al. | 385/24 |
| 6,289,151 B1 | * | 9/2001 | Kazarinov et al. | 385/32 |
| 6,538,787 B1 | * | 3/2003 | Moeller et al. | 398/158 |
| 6,556,320 B1 | * | 4/2003 | Cao | 398/65 |

* cited by examiner

Primary Examiner—Ellen E. Kim

(57) ABSTRACT

In accordance with the invention, an optical data transmission system is provided with an integrated dual dispersion compensator that can compensate both chromatic dispersion and PMD. The compensator comprises in essence, a substrate-supported planar waveguide structure having a planar transmission waveguide coupled to an integrated chromatic dispersion compensator and to an integrated PMD compensator. The chromatic dispersion compensator is advantageously a length of waveguide coupled to an all-pass filter. The PMD compensator is advantageously a polarization separator for separating the two polarization components between two waveguide subpaths and at least one delay element coupled to at least one subpath to compensate propagation delays. The subpath beams can then be combined to an optical signal compensated for both chromatic dispersion and PMD. In a preferred embodiment the chromatic dispersion compensator and the delay element are both tunable.

12 Claims, 5 Drawing Sheets

INTEGRATED OPTICAL DUAL DISPERSION COMPENSATOR FOR COMPENSATING BOTH CHROMATIC AND POLARIZATION MODE DISPERSION

FIELD OF THE INVENTION

This invention relates to optical data transmission systems and, in particular, to transmission systems provided with integrated dual dispersion compensators that can be readily fabricated in planar waveguide form.

BACKGROUND OF THE INVENTION

Optical fiber transmission systems are beginning to achieve their great potential for the rapid transmission of vast amounts of information. In essence, an optical transmission system comprises an optical signal source and an optical fiber transmission path for carrying the optical signals. It may also include a receiver for detecting the signals and demodulating the information they carry. Increasingly the optical signals are wavelength division multiplexed signals (WDM or DWDM signals) comprising a plurality of distinct wavelength signal channels. In each channel information is typically transmitted as a sequence of optical pulses.

Chromatic dispersion compensators are important components of optical transmission systems. Chromatic dispersion occurs when signal components of different wavelengths are subject to different propagation delays. Such dispersion can distort a transmitted pulse and deteriorate the information content of a signal channel. Chromatic dispersion compensators (CDCs) equalize the propagation delays among the different wavelength components and maintain the quality of the transmitted information.

There are a wide variety of chromatic dispersion compensators. An early form of CDC disposes in the transmission path a length of specially fabricated dispersion compensating fiber (DCF). The DCF slows the fast wavelength components and/or speeds up the slow components. Compensation typically requires long lengths of such fiber, and the DCF is difficult to tune. DCFs cannot be easily integrated into planar waveguide form because of their great length. Another CDC uses a dispersion compensating grating (DCG). The DCG is typically a chirped Bragg grating operated in a reflection mode. The chirping is designed so that faster wavelength components travel farther in the grating before they are reflected, with the consequence that the faster components are effectively slowed. However since the Bragg gratings operate in a reflection mode, they are typically coupled to the transmission path by bulky and expensive optical circulators. DCG compensators cannot be fully integrated because they require circulators.

Particularly promising chromatic dispersion compensators have been developed which can be integrally fabricated in planar waveguide form. Such compensators are compact and relatively inexpensive. One example of such a dispersion compensator is the optical all-pass filter described in U.S. Pat. No. 6,289,151 issued to R. Kazarinov et al. on Sep. 11, 2001 and entitled "All-Pass Optical Filters," which is incorporated herein by reference. In essence, Kazarinov et al. device comprises one or more tiny optical waveguide ring resonators optically coupled to a length of transmission waveguide.

Unfortunately planar waveguides are highly birefringent. As a consequence, introducing a planar waveguide dispersion compensator along a data transmission path produces another type of dispersion referred to as polarization mode dispersion (PMD). PMD is dispersion due, not to the wavelength components of the transmitted light, but rather to the polarization components. The light pulse may be thought of as partitionable into two different orthogonal polarization directions. In a birefringent structure, the speed of one polarization component will increase over the other, gradually spreading and distorting the pulse. As a consequence there is a need for an integrated dual dispersion compensator that can compensate both chromatic dispersion and PMD.

SUMMARY OF THE INVENTION

In accordance with the invention, an optical data transmission system is provided with an integrated dual dispersion compensator that can compensate both chromatic dispersion and PMD. The compensator comprises in essence, a substrate-supported planar waveguide structure having a planar transmission waveguide coupled to an integrated chromatic dispersion compensator and to an integrated PMD compensator. The chromatic dispersion compensator is advantageously a length of waveguide coupled to an all-pass filter. The PMD compensator is advantageously a polarization separator for separating the two polarization components between two waveguide subpaths and at least one delay element coupled to at least one subpath to compensate propagation delays. The subpath beams can then be combined to an optical signal compensated for both chromatic dispersion and PMD. In a preferred embodiment the chromatic dispersion compensator and the delay element are both tunable.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
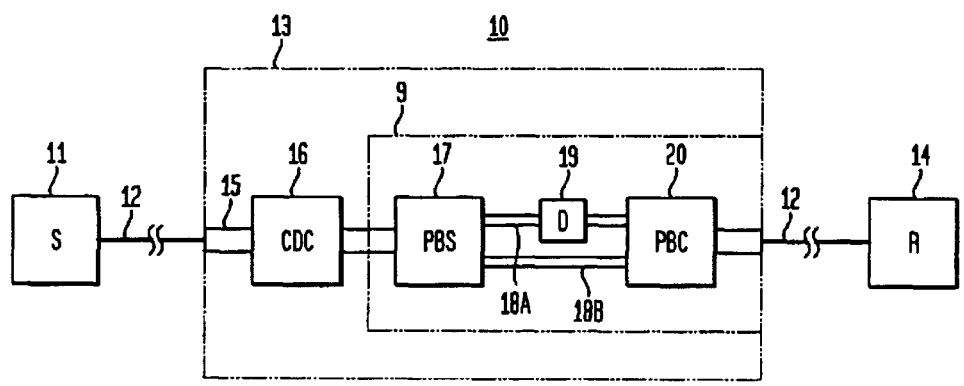
FIG. 1 is a schematic diagram of an optical transmission system including a dual dispersion compensator in accordance with the invention.

Referring to the drawings, FIG. 1 is a schematic diagram of an optical transmission system 10 comprising an optical signal source 11, an optical fiber transmission path 12 for transmitting optical signals from source 11, an integrated dual dispersion compensator 13 and an optional optical receiver 14. It is presumed that the fiber path 12 is subject to unwanted chromatic dispersion. The signal source 11, fiber path 12 and receiver 14 can be conventional devices well known in the optical communications art.

The integrated dual dispersion compensator 13 schematically shown in FIG. 1 can be an integrated planar waveguide structure composed of a substrate-supported planar waveguide transmission path 15 optically coupled to an integrated chromatic dispersion compensator 16. The integrated chromatic dispersion compensator 16 can be any of several known compensating devices that can be integrated into a planar waveguide device. Advantageously it is an all-pass filter comprising a waveguide ring resonator 160 optically coupled to the waveguide transmission path 15.

Preferably located downstream of the chromatic compensator 16 is an integrated PMD compensator 9. An exemplary PMD compensator 9 comprises a polarization separating element 17 for coupling light of different polarizations to plural transmission subpaths 18A and 18B. At least one of the subpaths, e.g. 18A, is optically coupled to at least one delay element 19 for compensating polarization mode dispersion. A polarization combiner 20 downstream of delay element 19 combines the polarized beams in the subpaths to produce a compensated signal. In preferred embodiments, the chromatic dispersion compensator 16 and the PMD compensator 9 are both tunable.

In operation, signal light subjected to chromatic dispersion by passage through a strand of fiber 12 enters onto transmission path 15 passing along the path and possibly through optional components 21. The light then passes through chromatic dispersion compensator 16. The chromatically compensated light, having been subjected to polarization mode dispersion, then enters PMD compensator 9 at separating element 17. Light of one polarization component (here the faster component) enters subpath 18A, and the other polarization component enters subpath 18B. Delay element 19 in path 18A appropriately delays the faster component so that when 18A and 18B are polarization recombined at combiner 20, the signal light has been compensated for both chromatic dispersion and PMD. If the chromatic dispersion compensator 16 and PMD compensator 9 are tunable, a high degree of compensation can be attained.

Figure 2:
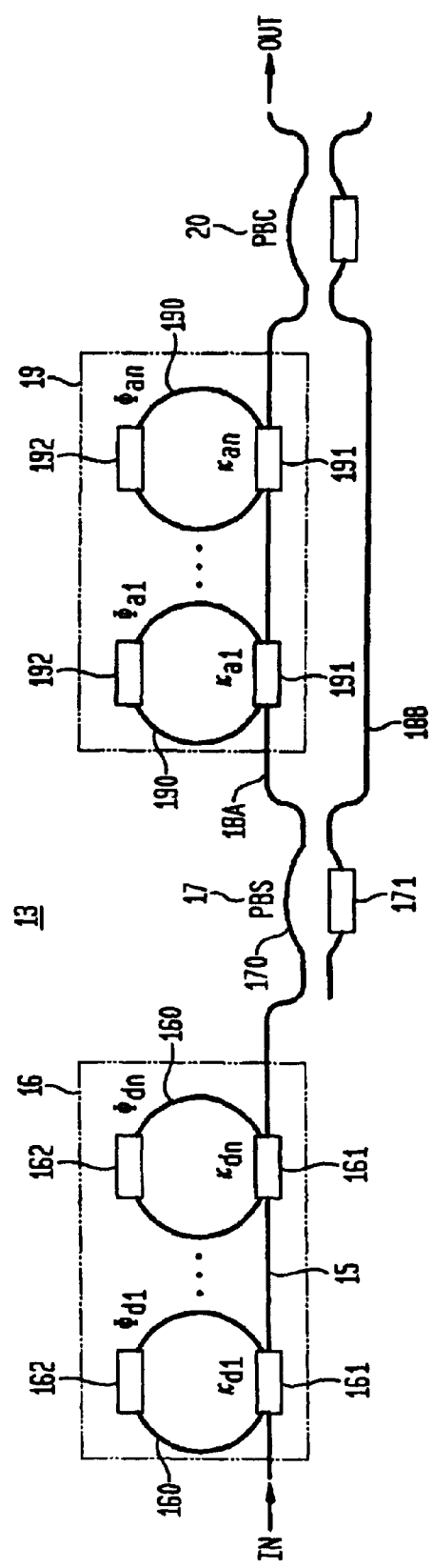
FIG. 2 illustrates an exemplary integrated dual dispersion compensator useful in the system of FIG. 1.

FIG. 2 illustrates in greater detail an advantageous integrated dual dispersion compensator 13 useful in the system of the system of FIG. 1. In this embodiment, the chromatic dispersion compensator 16 comprises a tunable all-pass filter comprising a plurality of waveguide resonators 160 (here a plurality of N resonators), each resonator optically coupled to the planar waveguide transmission path 15. The resonators are preferably small waveguide rings of feedback length l optically coupled to path 15 by close adjacency or by a grating 161. Each feedback pathlength is tunable by a phase shifter 162. The feedback pathlengths $l_i$, coupling coefficients $k_i$ and phase shifts $\phi_i$ are chosen to provide chromatic dispersion compensation for one or more signal channels in the transmitted signal light. Further details concerning the structure and design of such chromatic dispersion compensators are set forth in the previously incorporated U.S. Pat. No. 6,289,151 to Kazarinov or in U.S. Pat. No. 6,259,847 issued to Lenz et al. on Jul. 10, 2001, which is also incorporated herein by reference.

From the output of chromatic dispersion compensator 16, the signal light passes to polarization mode compensator. The PMD compensator comprises a polarization beam splitter (PBS) 17 which can comprise a two-arm Mach-Zehnder interferometer 170 having a stress-applying silicon film 171 overlying a portion of at least one arm. The stress applying film is trimmed so that the birefringence induced in the underlying arm separates the two polarization components at the Mach-Zehnder output, the faster component traveling on subpath 18A and the slower component on subpath 18B. Additional details concerning the design and construction of this PBS are set forth in M. Okuno et al., "Birefringence Control of Silica Waveguides on Si and its Application to a Polarization-Beam Splitter/Switch," 12 *Journal of Lightwave Technology* No. 4, p. 625 et seq. (April 1994).

The subpath 18A that receives the faster polarization component is provided with a delay element 19, advantageously a variable delay element comprising an all-pass filter similar to the dispersion compensator 16. The delay element 19 here comprises a plurality of N waveguide ring resonators 190 each optically coupled to the subpath waveguide 18A by close adjacency or by a grating 191. Each resonator 190 has a feedback pathlength lj tunable by a phase shifter 192. The pathlengths $l_j$, coupling coefficients $k_j$ and phase shifts $\phi_j$ are chosen or adjusted to delay the fast polarization component by an amount to compensate for the slower speed of the polarization component in subpath 18B. The beams in subpath 18A and 18B are then combined to a single beam by a polarization beam combiner (PBC) 20 that is substantially identical to the PBS 17. Tuning of the phase shifters $\phi_j$ permits a high degree of PMD compensation so that the combined output is compensated for both chromatic dispersion and PMD. Further details concerning the structure and operation of the PMD compensator are set forth in applicant's co-pending U.S. patent application Ser. No. 09/825,691 filed Apr. 4, 2001 and entitled "Polarization Mode Dispersion Compensator For Optical Fiber Communication System," which is incorporated herein by reference.

As can be readily appreciated, the dual compensator of FIG. 2 does not require excessive lengths of waveguide or non-integrable components such as circulators. It provides a highly compact structure, the components of which can be readily fabricated on a silicon substrate by silicon bench technology. Silica formed on the substrate provides the lower cladding. Photolithography of a lower cladding region defines the pattern for doping waveguide cores for all components. An upper silica cladding can then be formed and photolithography of the upper silica cladding defines openings for the silicon patches and phase shifters. The result is an integrated dual compensator for compensating both chromatic dispersion and PMD.

Figure 3:
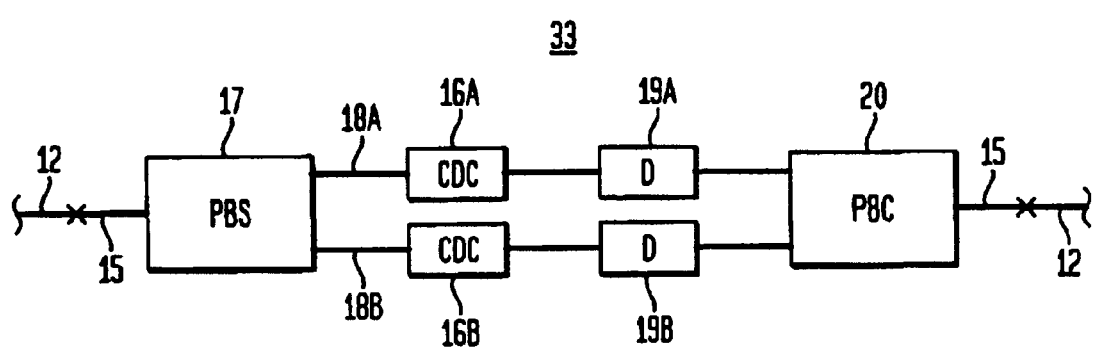
FIG. 3 schematically illustrates an alternative dual dispersion compensator wherein chromatic dispersion compensation is effected within the PMD compensator.

FIG. 3 schematically illustrates an alternative embodiment of a dual dispersion compensator wherein chromatic dispersion compensation is effected within the waveguide subpaths 18A and 18B of the PMD compensator. Specifically, the dual dispersion compensator 33 comprises a PBS 17 for coupling light of different polarizations to the subpaths. Each subpath contains a CDC (16A, 16B) and a variable delay element. Each CDC compensates chromatic dispersion in the light traveling its respective subpath, and the variable delay elements 19A, 19B are adjusted so that the delay difference compensates the propagation delay difference between the two polarization modes. The compensated beams are polarization combined at PBC 20. The PBS 17, the CDCs 16, the variable delay elements 19 and the PBC 20 can be similar in structure to the devices described in connection with FIG. 2.

Figure 4:
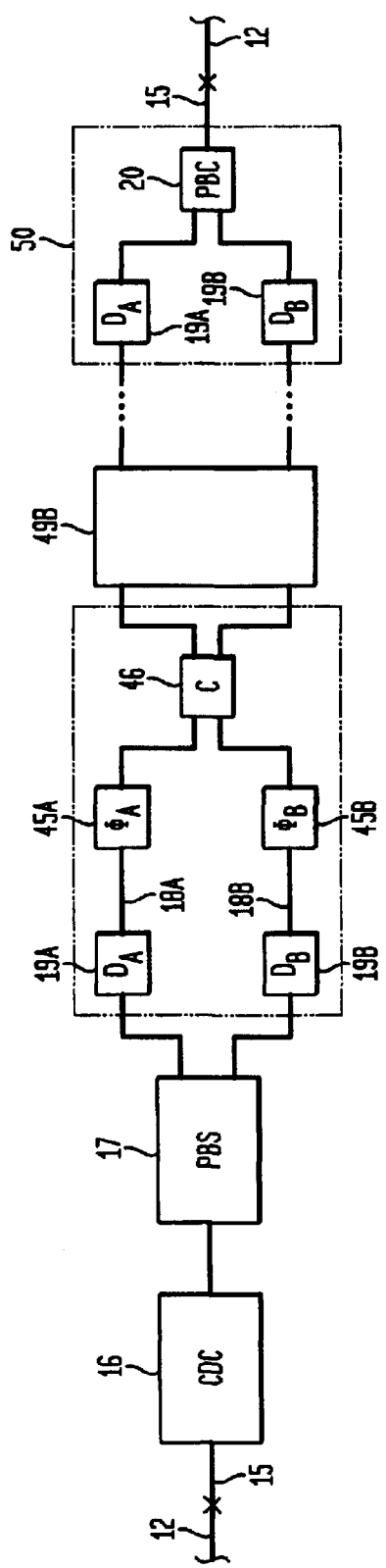
FIG. 4 shows an alternative dual dispersion compensator providing higher order PMD compensation.

In applications where PMD is large or must be compensated with great precision, it is desirable to provide higher order PMD compensation using a series of PMD compensating units. FIG. 4 schematically shows an alternative embodiment of a dual dispersion compensator 43 providing higher order PMD compensation in a readily integrated form.

The dual dispersion compensator 43 comprising in sequence a CDC 16, a PBS 17, and a plurality of repeating PMD compensating units 49A, 49B, . . . in a serial sequence.

Each repeating unit 49A, 49B, . . . comprises a pair of subpaths 18A, 18B, at least one subpath (and preferably both) including a variable delay element 19 and at least one subpath including phase shifter 45. The two subpaths feed into a tunable coupler 46 for presentation to the next succeeding unit.

A final PMD compensating unit 50 can include a PBC 20 for presenting a compensated polarization combined signal at the output.

The variable delay elements are adjusted so that the delay difference compensates the propagation delay difference between the two polarization modes. The serial sequence of plural PMD compensators 49A, 49B . . . are adjusted to provide increasingly precise compensation, and the output of the serial sequence is polarization combined in PBC 20.

It is contemplated that the same planar waveguide substrate that includes the integrated dual dispersion compensator may also include other integrated waveguide components such as monitors, filters switches or amplifiers. Such components can all be integrally fabricated on the same substrate in accordance with techniques well known in the art such as silicon optical bench technology.

Figure 5:
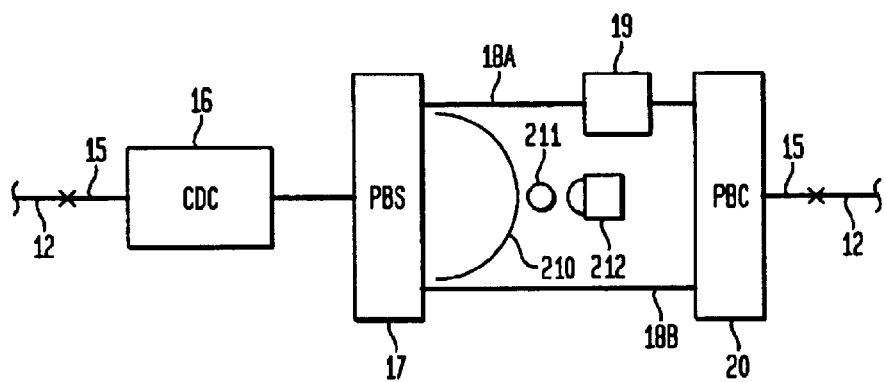
FIG. 5 illustrates a dual dispersion compensator integrated with a PMD dispersion monitor.

A PMD monitor can measure the relative delay between polarization components on separate paths and is useful in adjusting PMD compensators. FIG. 5 illustrates the advantageous integration of a dual dispersion compensator 13 and a polarization mode dispersion monitor on a common substrate. In a preferred embodiment, the monitor comprises an optical tap 210 coupled to subpaths 18A and 18B, a narrow band sweep filter 211 receiving samples of the polarization separated light via tap 210 and a detector 212 for detecting the interference between the two polarizations. The monitor can, for example, be used to tune delay element 19 to provide the appropriate amount of delay for compensation. Further details concerning the structure and operation of this PMD monitor may be found in applicant's co-pending U.S. Provisional Application Serial No. 60/363,397 entitled "Apparatus and Method For Measurement and Adaptive Control of Polarization Dispersion In Optical Fiber Communication Systems." Application Serial No. 60/363,397 is incorporated herein by reference.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. An optical data transmission system comprising:
   a source of optical signal light;
   an optical fiber path optically coupled to the source for transmitting the signal light, the optical fiber path subject to chromatic dispersion; and
   a planar waveguide device optically coupled to the optical fiber path, the planar waveguide device comprising a length of planar waveguide optically coupled to an integrated compensator of chromatic dispersion and polarization mode dispersion.

2. The system of claim 1 wherein the integrated compensator comprises an all-pass filter coupled to the planar waveguide.

3. The system of claim 1 wherein the integrated compensator comprises at least one waveguide ring resonator optically coupled to the planar waveguide.

4. The system of claim 1 wherein the integrated compensator comprises:
   a polarization beam separator to separate separating the signal light into differently polarized beams on different planar waveguide subpaths, the differently polarized beams having different propagation speeds;
   a delay element optically coupled to the subpath guiding the faster polarization beam to reduce the effective propagation speed of the faster beam; and
   a polarization recombiner to recombine the differently polarized beams.

5. The system of claim 4 wherein the delay element comprises an all-pass filter.

6. The system of claim 4 wherein the polarization beam separator comprises a Mach-Zehnder interferometer having a stressed arm.

7. The system of claim 2 wherein the all-pass filter is tunable.

8. The system of claim 4 wherein the delay element is tunable.

9. The system of claim 4 wherein each subpath includes a chromatic dispersion compensator to compensate chromatic dispersion in the subpath.

10. The system of claim 1 wherein the integrated polarization mode dispersion compensator comprises:
    a polarization beam separator to separate signal light into differently polarized beams on different planar waveguide subpaths, the differently polarized beams having different propagation speeds;
    a delay element optically coupled to each subpath, the delay elements adjusted to compensate propagation delay differences between the differently polarized beams; and
    a polarization recombiner to recombine the differently polarized beams.

11. The system of claim 10 wherein the polarization mode dispersion compensator comprises a sequence of PMD compensating units, each unit comprising a pair of waveguide subpaths, at least one subpath in each unit including a delay element.

12. The system of claim 4 further comprising a polarization mode dispersion monitor coupled to the subpaths.

* * * * *